United States Patent

Rodgers

[15] 3,655,220
[45] Apr. 11, 1972

[54] SPARE WHEEL CARRIER FOR SUPPORTING TONGUE OF TRAILER

[72] Inventor: Leonard R. Rodgers, P.O. Box 267, Pittsfield, Pa. 16340

[22] Filed: Apr. 7, 1970

[21] Appl. No.: 26,239

[52] U.S. Cl. ................................280/475, 280/150.5, 214/454
[51] Int. Cl. .............................................................B60s 9/02
[58] Field of Search .....................280/475, 150.5; 214/454; 224/42.23

[56] References Cited

UNITED STATES PATENTS

| 2,954,963 | 10/1960 | Berg | 280/150.5 X |
| 2,810,588 | 10/1957 | Rozett | 280/150.5 |
| 2,965,392 | 12/1960 | Mitchell | 280/150.5 |
| 2,091,071 | 8/1937 | Girl | 214/454 |
| 3,237,960 | 3/1966 | Ziegler | 280/150.5 X |
| 2,578,466 | 12/1951 | Ek et al. | 224/42.23 |
| 2,956,716 | 10/1960 | Goulet | 224/42.23 X |

*Primary Examiner*—Leo Friaglia
*Attorney*—Charles L. Lovercheck

[57] ABSTRACT

This specification discloses a spare wheel and tire carrier for a trailer. The carrier is made in such a way that the trailer wheel may be used as a tongue truck or ground engaging wheel supporting the trailer tongue for use in parking the trailer. The wheel is supported in an especially efficient manner.

2 Claims, 2 Drawing Figures

Patented April 11, 1972

3,655,220

Inventor
LEONARD R. RODGERS

By
Charles L. Lauchech Attorney

SPARE WHEEL CARRIER FOR SUPPORTING TONGUE OF TRAILER

OBJECTS OF THE INVENTION

It is an object of the invention to provide an improved spare wheel and tongue truck combination for a trailer or the like.

Another object of the invention is to provide an improved combination trailer and tongue truck.

Another object of the invention is to provide a tongue truck which is simple in construction, economical to manufacture, and simple and efficient to use.

DETAILED DESCRIPTION OF THE DRAWINGS

Figure 1:
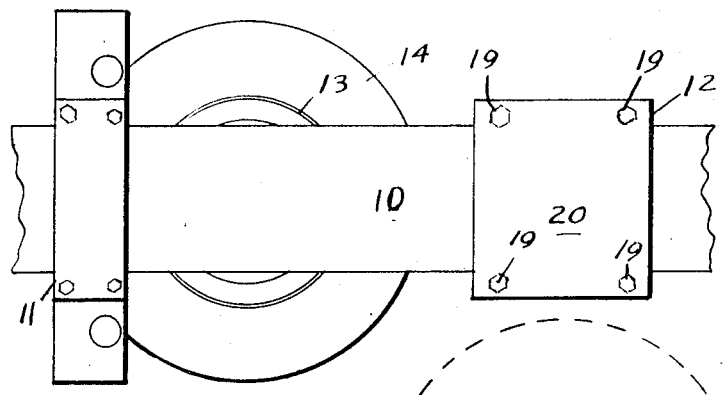
FIG. 1 is a top view of the trailer tongue and tongue truck according to the invention.

Now with more particular reference to the drawings, a trailer tongue 10 is shown which is intended to be the tongue of a two-wheel trailer such as a house trailer, box trailer, boat trailer type or the like. The tongue has a carrying rack 11 attached to it and a wheel mount 12 attached in spaced relation to the carrying rack. The wheel mount 12 has a wheel 13 with a tire 14 supported in the fork 15. The fork has a fork plate 27 which is pinned and swingably supported by pin 17 to the lock plate 16. The lock plate 16 has two spaced holes which receive pins 17 and 18. When the pin 18 is removed, the wheel and fork can be swung to the position shown in full lines in FIGS. 1 and 2. When the wheel is swung down to the position shown in phantom lines, the plate 16 can be swung around the swivel joint 28 so that the wheel can be used as a tongue truck. The plate 26 of the fifth wheel is clamped to the tongue by means of bolts 19 and nuts 22 on them and a bearing material 30 is disposed between the plate 26 and the plate 16 so that the two can rotate relative to each other. Plates 16 and 26 make up a fifth wheel. It will be noted that the swivel joint 28 is disposed off center toward the front in the plates 26 and 16 so that a castering effect is accomplished. The plate 12 may be considered to be an attachment plate. The carrying rack 11 has bolts 21 which have nuts 23 on them that hold the carrying rack 11. Pins 31 are disposed at each side of the carrying rack in the channel member 32 and when the cotter pins 22 are removed, the entire tire can be swung down and laterally out of the carrying rack. Wheel 13 has the usual hub 34 and suitable bearings which are familiar to those skilled in the art.

Figure 2:
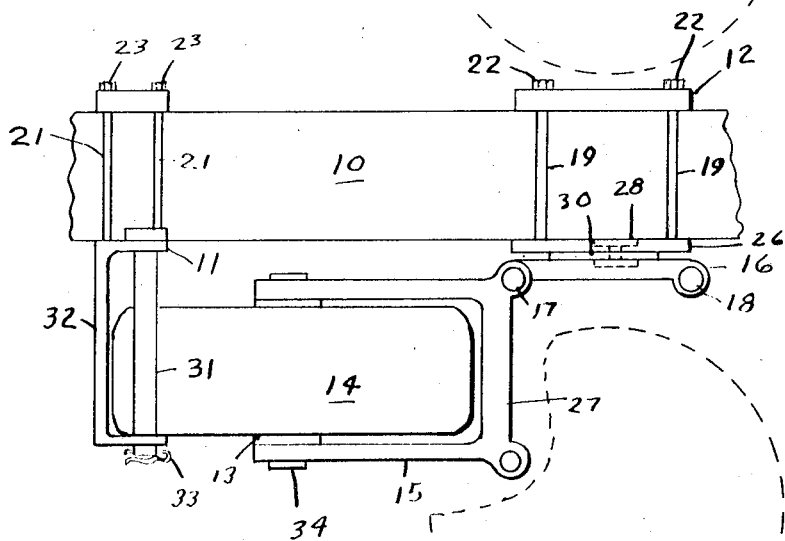
FIG. 2 is a side view of the trailer tongue and truck with the wheel shown in stowed position.

It will be noted that when the wheel is in the rack position shown in FIG. 2, the trailer can be towed by a suitable tractor vehicle. When the wheel is swung down to the phantom line position, the pin 18 can be replaced and the wheels pivoted as a caster around swivel joint 28 so that it will act as a tongue truck for the trailer.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A trailer tongue truck comprising
a fifth wheel comprising a fifth wheel plate and a lock plate,
means to clamp said fifth wheel plate to the tongue of the trailer,
bearing means disposed between said fifth wheel plate and said lock plate,
pivot means pivotably connecting said fifth wheel plate to said lock plate,
a fork,
a wheel in said fork,
said fork being swingably attached to said lock plate at an axis adjacent the rear edge of said lock plate and said fork,
ears on said fork having holes alignable with said holes in said lock plate and a pin adapted to be received in said hole,
said pin being removable whereby said fork with said wheel can swing to a position in a plane parallel to the plane of said tongue,
and means to lock said wheel in said swung position,
said means to clamp said fifth wheel to said tongue comprises bolts extending through said fifth wheel,
a clamp plate resting on said tongue,
and said bolts clamping said fifth wheel to said clamp plate,
said means to lock said wheel in said stowed position comprises a carrying rack,
said carrying rack comprising means supported on said trailer tongue for receiving an edge of a tire on said fifth wheel.

2. A trailer and tongue truck combination comprising a tongue,
means to clamp a fifth wheel plate to said tongue,
a lock plate,
bearing means disposed between said fifth wheel plate to said lock plate,
pivot means pivotably connecting said fifth wheel plate to said lock plate,
a fork plate swingably supported on said lock plate,
a wheel in said fork,
said fork plate being swingably attached to said lock plate at an axis adjacent the rear edge of said lock plate and said fork plate,
ears on said fork plate having holes alignable with said holes in said lock plate and a pin adapted to be received in said hole,
said pin being removable whereby said fork plate with said wheel can swing to a position in a plane parallel to the plane of said tongue,
and means to lock said wheel in said swung position,
said means to hold off said wheel in swung position comprising a channel means clamping one flange of said channel to the underside of said tongue,
said wheel being adapted to be swung bringing a portion of said wheel into said channel,
and pin means extending through the flanges of said channel retaining said wheel in said channel.

* * * * *